No. 674,311. Patented May 14, 1901.
R. W. EATON.
POWER REGISTERING MECHANISM FOR FLUID MOTORS.
(Application filed Mar. 12, 1900.)
(No Model.)
Fig. 1.
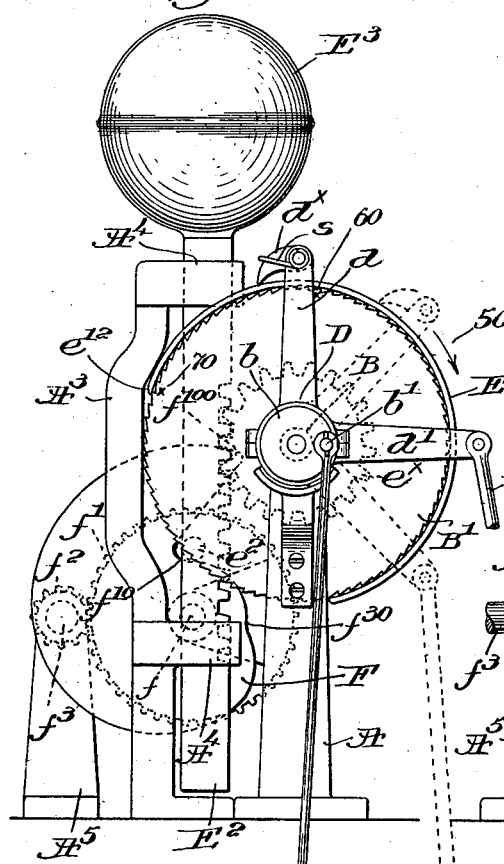
Fig. 2.
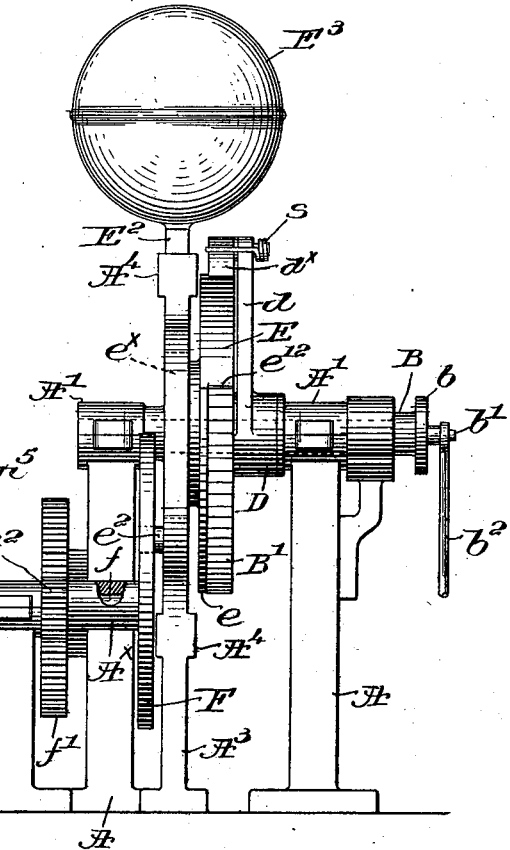
Fig. 3.
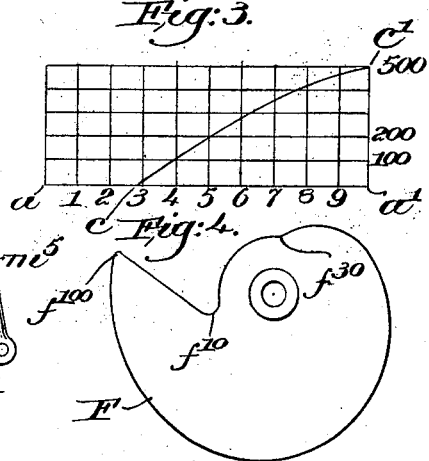
Fig. 4.
Witnesses,
Edward H. Allen.
Frank G. Hattie.
Inventor,
Russell W. Eaton
By Crosley Gregory
attys.

UNITED STATES PATENT OFFICE.

RUSSELL W. EATON, OF BRUNSWICK, MAINE, ASSIGNOR OF ONE-HALF TO M. U. ADAMS, OF WEST NEWTON, MASSACHUSETTS.

POWER-REGISTERING MECHANISM FOR FLUID-MOTORS.

SPECIFICATION forming part of Letters Patent No. 674,311, dated May 14, 1901.

Application filed March 12, 1900. Serial No. 8,251. (No model.)

*To all whom it may concern:*

Be it known that I, RUSSELL W. EATON, of Brunswick, county of Cumberland, State of Maine, have invented an Improvement in Power-Registering Mechanism for Fluid-Motors, of which the following description, in connection with the accompanying drawings, is a specification, like characters on the drawings representing like parts.

This invention has for its object the production of simple and effective means for registering or recording the power generated by the flow of fluids through motors, and it is particularly adapted for use in locations where the power is constantly or very frequently varying—as, for instance, in supplying power for an electric road. It is well known that in such instances the load varies between wide limits, and hence the power required is consequently changing, and it is necessary to ascertain the average power furnished in a given length of time to afford a basis for compensation for power. In the practical embodiment of my invention herein shown suitable registering mechanism for the power developed is operated by a member having an intermittent and variable movement, the extent of such movement being governed by or through a cam, the operating-surface of which corresponds to the "power curve" of the motor, the ordinates of such curve representing to scale the results of actual tests made upon the motor for power corresponding to certain quantities of discharge of the actuating fluid, and the positioning of such controlling-cam is governed according to the power developing in the motor.

Figure 1 is a side elevation of a registering mechanism embodying one form of my invention, a portion of the said mechanism being broken out to save space. Fig. 2 is a left-hand end elevation of the upper portion of the mechanism shown in Fig. 1. Fig. 3 is a diagram showing the manner of laying off the curve by which the operative surface of the controlling-cam is generated, and Fig. 4 is a plan view of the controlling-cam detached.

Referring to Figs. 1 and 2, suitable standards A are provided with bearings A' for a rotatable shaft B, having fast thereupon a ratchet-wheel B', and a face-plate $b$ at one end of said shaft, provided with a wrist-pin $b'$, connected, as herein shown, by a link $b^2$ with the actuating-arm $b^3$ of any suitable counting or registering device C, Fig. 1. The hub D of a pawl-carrier (shown as a bell-crank lever $d$ $d'$) is mounted loosely on the shaft B between the ratchet-wheel B' and one of the bearings A'. On the other side of the ratchet-wheel I have shown a gear $e^\times$, also loosely mounted on the shaft B between the other bearing A' and the ratchet-wheel, said gear having secured to or forming a part thereof a disk $e$, provided along a portion of its periphery with a segmental flange E, which projects over a portion of the toothed periphery of the ratchet-wheel B' and constitutes a shield to control the point at which a pawl $d^\times$ on the pawl-carrier shall engage the ratchet-teeth. A spring $s$ is herein shown to maintain the pawl in position to engage the ratchet-wheel whenever such engagement is permitted by the shield, as will be described.

An upright frame $A^3$ is provided with bearings $A^4$ for a vertically-movable rack-bar $E^2$, as herein shown, the teeth of which are in mesh with the gear $e^\times$, so that longitudinal movement of the rack-bar will rotate the gear, and thereby move the shield in one or the other direction to uncover more or less of the ratchet-wheel B' to the action of the pawl $d^\times$, and the rack-bar is shown as weighted, as at $E^3$, to normally depress it. A roller or other stud $e^2$ on the rack-bar projects therefrom to rest upon the operating-surface of a controlling-cam F, to be described, fast on a shaft $f$, mounted in a bearing $A^\times$ on one of the standards A, the said shaft having secured to it a gear $f'$, in mesh with a pinion $f^2$, the latter being connected with the gate-shaft $f^3$ of the motor, (not shown,) a bearing-stand $A^5$ being provided for the shaft $f^3$ adjacent the pinion $f^2$.

Referring to Fig. 1, I have represented the main shaft M of the water-wheel or motor as provided with a pulley $m$, which is connected by a suitable belt $m'$ with a second pulley $m^2$ on a counter-shaft $m^3$, said counter-shaft having fast thereon a crank $m^4$, connected by a link $m^5$ with the lever-arm $d'$ of the pawl-carrier.

The cam F is geared to make substantially one revolution between the closed and fully-open positions of the gate controlling the passage of fluid to the motor, the operating-surface of the cam being so designed that its radius at the point of engagement of the stud $e^2$ of the rack-bar shall at all positions of the wheel-gate be proportional to the power generated by the wheel at such gate-opening, as ascertained by actual tests. Referring to Fig. 3, let the line $a\ a'$ represent the position of the gate from its closed to its fully-open position, said line being for convenience divided into ten equal parts, and assume, for illustration, that the ordinates 1 2 3, &c., represent to scale the power developed by the motor as ascertained by actual tests at successive tenths of gate-opening, with a horse-power of five hundred when the gate is fully opened.
Then the curve $c\ c'$ will represent the operating-surface of the cam F, the radii thereof being proportional to the power developed at corresponding gate-openings, the cam being constructed in accordance with the curve $c\ c'$.
Assuming that in actual practice it has been found unnecessary to consider the power developed until the gate has been opened a considerable distance—nearly three-tenths, as herein shown—the surface of the cam F may be made as a circular arc from $f^{10}$ to $f^{30}$, Fig. 1, to represent such unconsidered power. The radius is gradually increased from $f^{30}$ to $f^{100}$, so that when the gate is fully open the stud $e^2$ on the rack $E^2$ will be at or adjacent such point $f^{100}$ of the cam. In Fig. 1 the cam is shown in the position assumed when the gate is shut. If the rack-bar $E^2$ be raised for full gate—say five inches above its position for closed gate—with five hundred horse-power developed, and assuming that it has been ascertained that two hundred horse-power will be developed at half-gate, the corresponding position of the cam F, owing to its design, will have raised the rack-bar two inches above closed-gate position, expressed by the proportion $$2:5::200\text{ H. P.}:500\text{ H. P.},$$

it will be manifest that the cam can be so designed that the rack $E^2$ will be raised at any time above its lowest or closed-gate position a known distance proportional to the power developed by the motor at the corresponding gate-opening. The shield E through the gear $e^x$ and its engagement with the rack will also be angularly moved around the face of the ratchet-wheel B', and when the gate is closed the leading edge $e^{12}$ of the shield will occupy the extreme position. (Shown in Figs. 1 and 2.) From this extreme position the leading edge of the shield will be moved in the direction of arrow 50, Fig. 1, through an arc determined by the longitudinal movement of the rack $E^2$, and consequently determined by the position of the controlling-cam, and when the highest part of the latter is in engagement with the stud $e^2$, as it will be at full gate, the leading edge of the shield will be in its extreme position to the right, viewing Fig. 1. The pawl $d^x$ has a constant stroke; but the angle through which the ratchet-wheel B' is moved thereby will depend upon the position of the shield. The greater the retractive movement of the latter in the direction of the arrow 50 the sooner will the pawl in its forward stroke engage the ratchet-teeth and the greater the angle through which the ratchet will be moved. From the foregoing it will be manifest that the arc on the ratchet-wheel B' exposed by the shield to the action of the pawl will be proportional to the power of the motor developed at that time in the same ratio that the maximum exposed arc of the ratchet-wheel bears to the power of the wheel at full gate.

The mechanism for actuating the pawl-carrier is so adjusted that in its forward movement the point or edge of the pawl $d^x$ just reaches a point adjacent the shield edge $e^{12}$ when the shield is in the position shown in Fig. 1, and it will be obvious that the pawl will ride upon the shield without coöperating with the ratchet-wheel B' until the shield has been retracted a distance dependent upon the gate-opening, as has been described. Upon such retraction of the shield then the pawl will move the ratchet-wheel forward an angular distance equal to the angular retraction of the shield, and from the foregoing it follows that the pawl will at any time advance the gear a distance which bears the same relation to the maximum distance when the gate is wide open as the power developed at that time bears to power developed at full gate. Such rotation of the ratchet-wheel B' rotates the shaft B, and through wrist-pin $b'$ and link $b^2$ the counter or register C is operated to record the number of revolutions of said shaft B. Assuming now that the wheel-gate is wide open and that through suitable mechanism, as herein described, the shield has been retracted to expose the maximum arc of the ratchet-wheel to the action of the pawl, let it be assumed that the gate remains wide open for one hour. Obviously at each stroke of the pawl $d^x$ the ratchet-wheel will be advanced its maximum distance, and when one revolution has been completed the reading of the register or counter C will be increased by one. Assume now for illustration that the power developed at full gate is five hundred horse-power, and also assume that the speed of counter-shaft $m^3$ has been made such that it will through the connections described operate the pawl-carrier a sufficient number of times, so that during one hour, with the maximum arc of the ratchet-wheel exposed, the shaft B will make five hundred complete revolutions, then the same will be recorded on the register or counter C. If it then be assumed that the gate is partly closed, so as to develop, say, two hundred horse-power, then the rack $E^2$ will operate to move the shield E forward, so that its leading edge will be at about the point 60, Fig. 1, and the exposed arc of the ratchet-wheel will be from 60 to the extreme forward throw of the pawl, as 70; but we have the proportion as arc 60 to 70 is to the maximum exposed arc so is two hundred to five hundred, and the ratchet-wheel B' and shaft B will make two hundred revolutions per hour, which will be recorded by the register or counter indicating two hundred horse-power.

It is evident that whatever power may be developing in the motor at the moment of the stroke of the pawl the ratchet-wheel, and therethrough the counter or register, will be advanced such an amount that at the end of an hour the reading of the counter will represent with great accuracy the average horse-power of the motor at the times during such hour the strokes of the pawl were made.

In practice the pawl is arranged to make a large number of strokes per hour, reducing the margin of error and increasing the practical accuracy of the mechanism. By taking the difference in the readings of the counter or register during a period of, say, twenty-four hours and dividing by the number of hours run the average horse-power per hour is ascertained.

As an instance of the operation of the apparatus a particular case will be taken wherein power is furnished to an electric street-railway, the wheel-gates being connected with suitable governors, the rapid and continual fluctuations of the load causing the governors to move the gates constantly, so that the power is continually varying. The problem presented was to determine from all of these innumerable changes the power being used, in order that the proper charge could be made therefor. It was found by actual experiment just how many strokes per hour of the pawl were necessary to advance the ratchet-wheel B', and thereby the counter C, to indicate in one hour the horse-power that the motor had by test been ascertained to develop at full gate, and in the particular case referred to two thousand and thirty-two strokes were necessary—that is, referring to the mechanism herein described, when the shield E is in position corresponding to full gate it permits the pawl $d^\times$ to move the ratchet-wheel B' substantially one-fourth of a revolution, and with the shield held in such position for one hour, the pawl making two thousand and thirty-two strokes, the ratchet-wheel is advanced one-fourth of two thousand and thirty-two, which equals five hundred and eight horse-power at full gate, as found by test. The counter-shaft $m^3$ is then arranged to give the pawl two thousand and thirty-two strokes per hour when the wheel or motor is revolving at normal speed.

It will be obvious that the mechanism herein described is applicable to any number of motors or wheels, the controlling-cam, however, being constructed in accordance with the power curve of its particular motor, as has been described.

As a check on the day's work it is convenient in actual practice to have a counter suitably connected with the pawl-carrier to register the strokes thereof.

The particular construction of the counter or register is immaterial, and the particular mechanism herein shown for positioning the shield by or through the controlling-cam may be varied or modified without departing from the spirit and scope of my invention.

The weight $E^3$ is used herein to insure the engagement of the stud $e^2$ of the rack with the operative surface of the controlling-cam and to facilitate the movement of the shield oppositely to the arrow 50.

The exposed arc of the ratchet-wheel indicates, for the purposes of this application, the portion of its periphery exposed by the shield to the action of the pawl, and by the term "effective stroke" of the pawl I mean such a stroke as will advance the ratchet-wheel a greater or less distance, according to the length of the exposed arc of the latter.

Having described my invention; what I claim as new, and desire to secure by Letters Patent, is—

1. In apparatus of the class described, a counter, actuating mechanism therefor including a ratchet-wheel, a pawl to coöperate therewith, having a constant stroke, and a shield to determine the starting-point on the ratchet-wheel of the effective stroke of the pawl, combined with means to govern the position of the shield, said means including a cam movable in accordance with the gate-opening and having its operative surface conforming to the power curve of the motor, determined by tests or computation for power developed at different gate-openings.

2. In apparatus of the class described, a counter, actuating mechanism therefor including a ratchet-wheel, a pawl to coöperate therewith, having a constant stroke, and a shield to determine the starting-point on the ratchet-wheel of the effective stroke of the pawl, combined with means to govern the position of the shield, said means including a cam having its operative surface conforming to the power curve of the wheel, determined by tests or computation for power developed by the motor at different gate-openings.

3. In apparatus of the class described, a counter, actuating mechanism therefor including a ratchet-wheel, a pawl to coöperate therewith, having a constant stroke, an angularly-movable shield extended over the periphery of the ratchet-wheel, to determine the starting-point thereon of the effective stroke of the pawl, and a gear angularly movable with the shield, combined with a rack in mesh with said gear and having a projection or stud, a cam having its operative surface, in engagement with said stud, conforming with the power curve of the motor, determined by tests or computation, whereby the position of the shield, controlled by the cam, will be such as to effect an angular movement of the ratchet-wheel by the pawl proportional to the power developed by the motor at a gate-opening corresponding to the position of the cam, and means to position the cam in accordance with the gate-opening.

In testimony whereof I have signed my name to this specification in the presence of two subscribing witnesses.

RUSSELL W. EATON.

Witnesses:
D. D. GILMAN,
PHILIP ROOT, Jr.